L. T. ROBINSON.
CURVE DRAWING INSTRUMENT.
APPLICATION FILED MAR. 30, 1903.
974,190.
Patented Nov. 1, 1910.
2 SHEETS—SHEET 1.
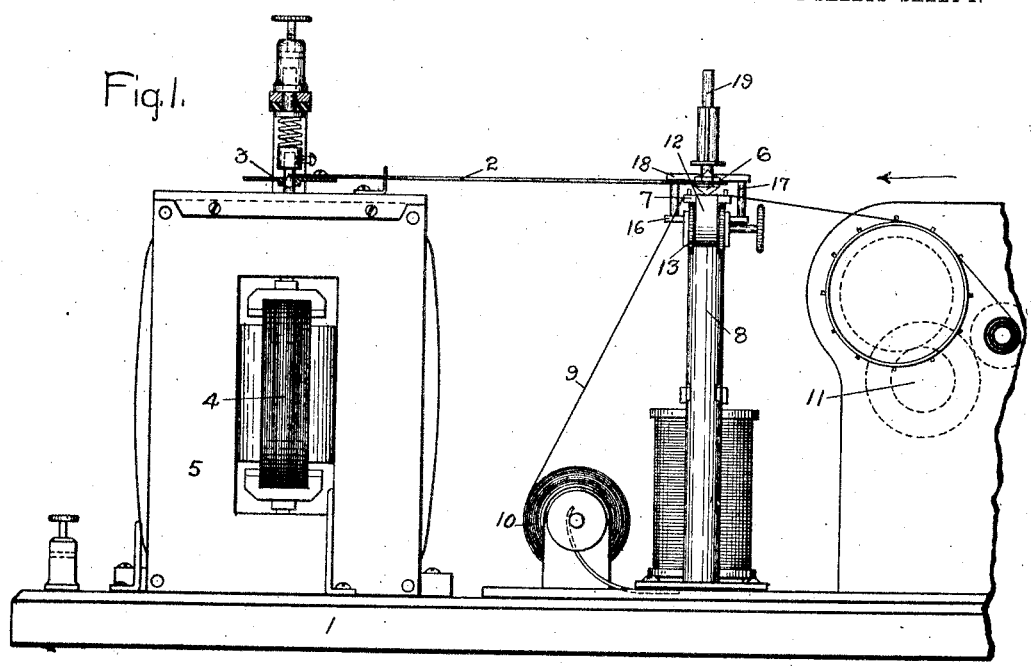
Fig. 1.
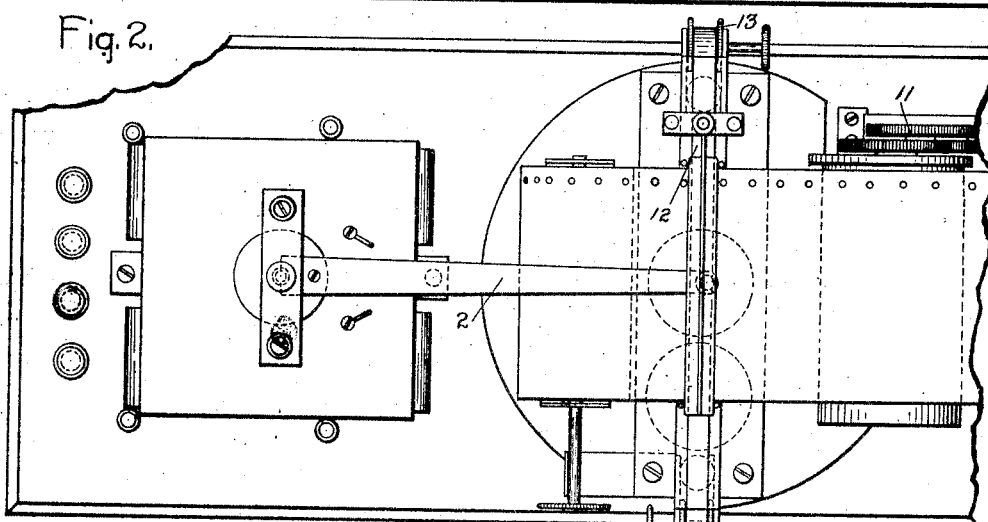
Fig. 2.
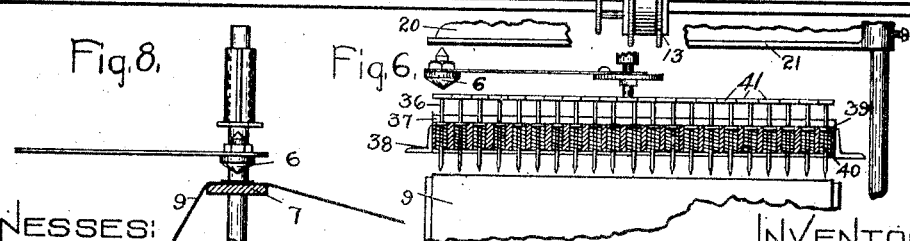
Fig. 8.   Fig. 6.
Fig. 7.
WITNESSES:
INVENTOR:
Lewis T. Robinson,
by Albert G. Davis
Atty.

L. T. ROBINSON.
CURVE DRAWING INSTRUMENT.
APPLICATION FILED MAR. 30, 1903.
974,190.
Patented Nov. 1, 1910.
2 SHEETS—SHEET 2.
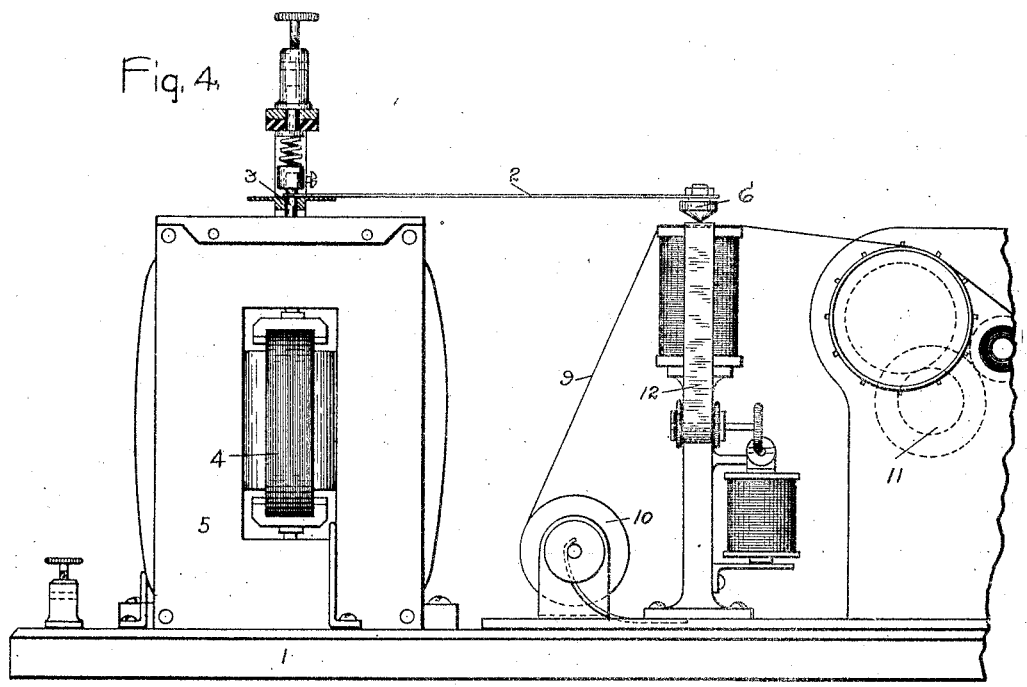
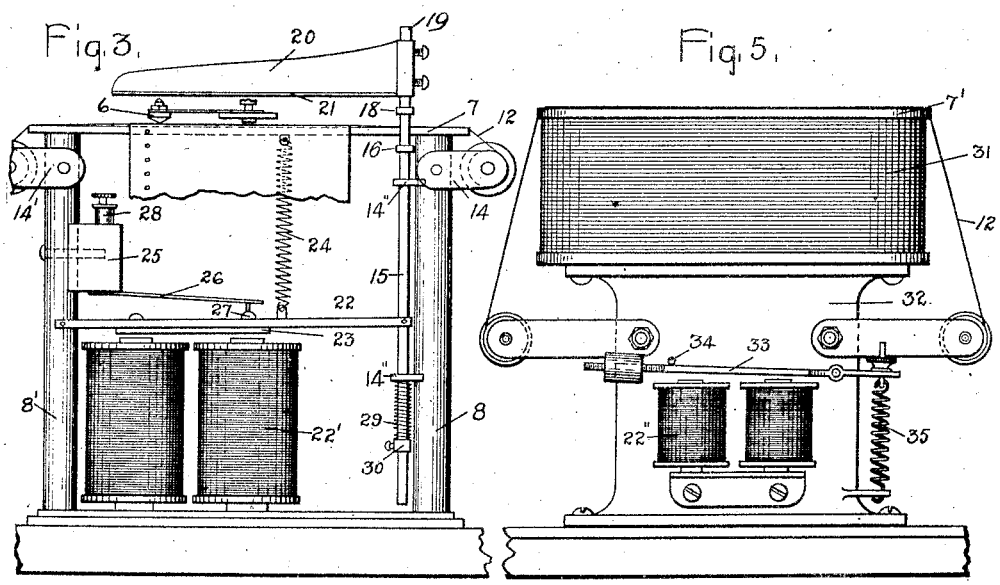
WITNESSES:
INVENTOR:
Lewis T. Robinson,
by
Atty.

UNITED STATES PATENT OFFICE.

LEWIS T. ROBINSON, OF SCHENECTADY, NEW YORK, ASSIGNOR TO GENERAL ELECTRIC COMPANY, A CORPORATION OF NEW YORK.

CURVE-DRAWING INSTRUMENT.

974,190.  Specification of Letters Patent.  Patented Nov. 1, 1910.

Application filed March 30, 1903. Serial No. 150,099.

*To all whom it may concern:*

Be it known that I, LEWIS T. ROBINSON, a citizen of the United States, residing at Schenectady, county of Schenectady, State of New York, have invented certain new and useful Improvements in Curve-Drawing Instruments, of which the following is a specification.

My invention relates to an improved construction of instruments of that character in which a record is made showing different values of a variable quantity.

More particularly my invention relates to an instrument with which a record is made upon a record surface having a progressive movement, the speed of the movement being usually some function of the time. Instruments of this character have been constructed in which a pencil, pen or other marking instrument carried by a member moving to different positions upon changes in the value of the variable quantity has been constantly in contact with the movable record surface. This construction is not desirable in those cases where the force producing the movement of the marking element is very slight owing to the considerable friction necessarily existing between the marking element and the record surface. In another type of recording instrument, the marking element moves normally out of engagement with the record surface and engages the record surface only at intervals to make a record. The intervals of time between successive record making engagements of this type of instrument has heretofore been controlled by time mechanism such as a spring motor. The record obtained by this instrument owing to the lack of continuity is not as satisfactory for all purposes as those obtained by the first mentioned type of instrument. The last described instrument however is free from the continuous frictional engagement between the marking element and the record surface which exists in the first mentioned instrument and which as I have before said may be detrimental under certain circumstances.

The object of my present invention is the construction of an instrument possessing the advantageous features of both types of the instruments described above without the disadvantages mentioned. I obtain this result by the employment of a marking element moving normally out of contact with the record surface, in combination with means for producing a much more rapid engagement between the marking element and the record surface than has heretofore been employed, thereby obtaining practically a continuous record. The means which I employ to obtain this result comprises electromagnetic means for forcing the marking element into contact with the record surface and an electromagnet circuit-making and breaking device or "buzzer" for causing an intermittent energization of the electromagnetic means which causes the engagement between the marking element and the record surface.

For a better understanding of my invention reference may be had to the drawings in which I have illustrated several embodiments of my invention.

Of the drawings Figure 1 is a side elevation, Fig. 2 a plan view, and Fig. 3 an end elevation showing a portion of the construction in Fig. 1 viewed in the direction of the arrow on Fig. 1, all illustrating one form of my invention; Fig. 4 is a view taken similarly to Fig. 1, and Fig. 5 a view taken similarly to Fig. 3 showing a modified form of the invention; Fig. 6 is a sectional end elevation, and Fig. 7 is a plan view illustrating details of another modified form of my invention; and Fig. 8 is a partial sectional elevation illustrating details of the construction illustrated in Figs. 1, 2 and 3.

In all of the forms of my invention, the mechanism is supported upon a base 1. The member moving in response to changes in the value of a variable quantity is an arm 2 which is shown as carried by the oscillating vertical shaft 3 upon which is mounted the movable coil 4 of a low torque voltmeter 5 which is suitably supported from a base 1.

In the construction illustrated in Figs. 1, 2, 3, and 8 the arm 2 carries at its outer end a marking element 6 having conical ends which extend at right angles to the plane of movement of the arm 2 as shown. This arm sweeps over the top of a bar or platform 7 parallel to the chord of the arc traversed by the marking element 6. The bar 7 is supported at the top of a pair of vertical posts 8 8' extending upward from the base 1. A record surface 9 is fed from a supply roll 10 across the platform 7 by any suitable mechanism as for instance a spring motor conventionally indicated at 11. A suitable transfer strip 12 such as the inked ribbon commonly employed in typewriters is fed lengthwise along the top of the platform 7 being transferred from one to the other of a pair of rolls 13 mounted in brackets 14 14' extending outward from the posts 8 8' respectively.

Guides 14" extend from the post 8 and in these guides a bar 15 is slidingly mounted. The bar 15 carries at its upper end a crossbar 16 from which extend a pair of vertical posts 17 which in turn carry another crossbar 18 parallel to the bar 16. The bars 16 and 18, and the posts 17 form a yoke which embraces the bar or platform 7. A post 19 extends upward from the top bar 18 in alinement with the post 15. A long arm 20 adjustably mounted upon the post 19 extends parallel to the bar 7. The arm 20 has a wide bearing surface 21 at its bottom which overhangs the marking element 6 in all of its positions.

An electromagnet 22' having vertical cores is carried by the support 1 between the posts 8 and 8'. The armature 23 for this electromagnet is carried by a substantially horizontal bar 22 pivotally connected at one end to the post 8' and at the other end to the bar 15. A spring 24 connected at one end to the upper side of a bar 22 and at the other end to the lower side of the platform 7 tends to hold the bar 22 in the position shown in Fig. 3. In this position the bar 15 is so held that the hammer arm 20 is out of contact with the marking element carried at the end of the arm 2. A bracket 25 carried by the post 8' has extending from its lower side a brush or flexible contact member 26 which engages with a contact device 27 mounted pon the upper side of the bar 22 when the bar 22 is in the position shown in Fig. 3. The contact 27 is in circuit with the windings of the coil 22'. The binding post 28 carried by the bracket 25 is in electrical contact with the contact member 26 and forms one terminal of the electromagnet. The other terminal has not been illustrated in the drawings.

It will readily be understood that the passage of current through the windings of the electromagnet 22' will cause the armature 23 to be attracted. This will reciprocate the bar 15 and the hammer 20, causing the marking element to be forced against the record ribbon to make a record upon the record strip. When the windings of the electromagnet 22' are energized and the armature 23 moves downward, the circuit through the windings of the electromagnet is broken by the separation of the contacts 26 and 27 which then takes place. This causes the electromagnet to be deënergized, whereupon the spring 24 moves the mechanism back into the position shown in Fig. 3. A spring 29 surrounding the bar 15 and extending between the lower guide 14" and a collar 30 adjustably secured on the bar 15 forms a means for regulating the upward movement of the bar 22 under the action of the spring 24. When the arm 20 is moved into the position shown in Fig. 3, due to the action of the spring 24, the arm 2 is free to oscillate in accordance with the changes in the torque tending to move the coil 4. As soon as the contacts 26 and 27 engage again, the circuit through the winding of the electromagnet 22' is again closed and the armature and the mechanism connected to it again drawn downward. The rapidity with which the reciprocation of the armature 23 and the hammer 20 takes place depends upon the proportioning of the various parts of the make and break device, but in any case is very rapid. The result of this rapid succession of engagements between the marking element and the record surface is a record which is practically continuous.

In the construction shown in Figs. 4 and 5, the platform 7' corresponding to the platform 7 heretofore mentioned is formed by the end of the core of an electromagnet 31 which is supported on a post 32 rising from the base 1. The post 32 also carries an electromagnet 22" similar in function to the electromagnet 22'. The counterbalanced armature 33 for the electromagnet 22" is pivoted to the post 32 and is adapted to engage and disengage a contact 34 carried by the post 32 under the alternate action of the spring 35 and the electromagnet 22". Preferably the electromagnets 31 and 22" are in circuit with one another and hence are both energized and deënergized simultaneously. When the electromagnet 31 is energized the marking element 6' which is formed of magnetic material such as soft iron is attracted. This causes the pointed end of the marking element to press against the ribbon 12 and make a record on the record strip 9. While I have described the magnets 22" and 31 as being in the same circuit, it will be readily understood that they might be in different circuits and that the armature 33 could open and close both of these circuits. By making the core of the electromagnet 31 substantially rectangular in cross-section and with its width equal to the width of the record strip the marking element 6' will be pulled directly down regardless of the position of its path in which it may happen to be located whenever the electromagnet 31 is energized.

The construction illustrated in Figs. 6 and 7 differs from the construction shown in Figs. 1, 2 and 3 in that the marking element 6' does not impinge directly against the record ribbon but against one of a series of plungers 36. The plungers 36 are mounted to reciprocate vertically in guideways 37 in a frame 38 fixed somewhat above the record sheet 9. The guideways 37 are enlarged intermediate their ends to receive a collar 39 placed on each plunger to limit its movement. Helical springs 40 surround the plungers and bear against the under side of the collar 39 in such manner as to hold the plungers 36 out of contact with the record sheet as shown in Fig. 6. Heads 41 are formed at the upper end of the plungers against which the marking element 6' impinges when the hammer 20 is reciprocated.

The marking ends of the plungers are spaced equally along the width of the record sheet. In case the instrument is of such a character that proportional changes of voltage do not produce corresponding angular movements of the arm 2, the heads 41 may be displaced as shown in Fig. 7 so as to correct for the irregular arc movement of the arm 2. It will readily be understood that the plungers may be arranged in a straight line at right angles to the direction of movement of the record surface in which case the heads could be displaced in lines parallel to the direction of movement of the record surface or the marking element 6 might have an elongated bearing edge so that an engagement between the marking element and the heads of the plungers would always be made when the hammer 20 was reciprocated.

It will of course be understood that my invention can be employed in connection with other measuring instruments than volt meters and that many modifications in the construction shown may be made without departing from the spirit of my invention, for instance instead of employing a record ribbon such as I have described, I might dispense with it and cause the marking element to impinge directly upon the paper to mark it by puncturing it or merely by impact.

What I claim as new, and desire to secure by Letters Patent of the United States, is—

1. In combination, means for supporting a record surface, a movable meter element, a series of marking devices arranged between the moving element and the record surface, and electromagnetic means for causing the moving element to engage with the particular marking device between it and the record surface to cause said marking device to make a record upon the record surface.

2. In combination an element moving in a path, a series of marking devices arranged in proximity to said path, each of said devices being provided with a stylus and an engaging portion, the engaging portions of some of the marking devices being displaced with reference to the corresponding styluses, and means for causing the moving element to engage with the engaging portion of the marking devices in proximity to the point in the path at which the moving element may happen to be.

In witness whereof I have hereunto set my hand this 26th day of March, 1903.

LEWIS T. ROBINSON.

Witnesses:
 BENJAMIN B. HULL,
 HELEN ORFORD.